United States Patent [19]

Schmid et al.

[11] Patent Number: 5,006,611
[45] Date of Patent: Apr. 9, 1991

[54] CURABLE EPOXY RESIN COMPOSITIONS OF MATTER CONTAINING A THERMOPLASTIC WHICH HAS PHENOLIC END GROUPS

[75] Inventors: Rolf Schmid, Schwarzenburg; Sameer H. Eldin, Fribourg, both of Switzerland

[73] Assignee: Ciba-Geigy Corporation, Ardsley, N.Y.

[21] Appl. No.: 463,044

[22] Filed: Jan. 11, 1990

[30] Foreign Application Priority Data

Jan. 20, 1989 [CH] Switzerland ................ 178/89

[51] Int. Cl.$^5$ .............................. C08L 63/00
[52] U.S. Cl. ........................ 525/423; 525/471; 525/482; 525/483; 525/484; 525/524; 525/526; 525/534; 525/535
[58] Field of Search ........... 525/423, 471, 482, 483, 525/484, 524, 526, 534, 535

[56] References Cited

U.S. PATENT DOCUMENTS

| | | | |
|---|---|---|---|
| 3,530,087 | 9/1970 | Hayes et al. | 525/534 |
| 3,577,442 | 5/1971 | Holler | 549/236 |
| 3,738,862 | 1/1973 | Klarquist et al. | 528/121 |
| 3,856,752 | 12/1974 | Bateman et al. | 528/229 |
| 3,931,109 | 1/1976 | Martin | 528/107 |
| 3,966,837 | 6/1976 | Riew et al. | 528/94 |
| 4,026,871 | 5/1977 | D'Alelio | 528/125 |
| 4,107,116 | 5/1978 | Riew et al. | 528/94 |
| 4,275,186 | 6/1981 | Kawakami et al. | 528/174 |
| 4,288,565 | 9/1981 | Lohse et al. | 521/135 |
| 4,322,456 | 3/1982 | Martin | 427/195 |
| 4,436,892 | 3/1984 | Zondler et al. | 528/117 |
| 4,448,948 | 5/1984 | Tsubaki et al. | 528/95 |
| 4,549,008 | 10/1985 | Renner et al. | 528/220 |
| 4,587,311 | 5/1986 | Schmid et al. | 525/504 |
| 4,649,181 | 3/1987 | Darms et al. | 525/524 |
| 4,855,339 | 8/1989 | Saito et al. | 528/104 |
| 4,868,059 | 9/1989 | Walker et al. | 528/103 |
| 4,874,669 | 10/1989 | Larson et al. | 528/104 |
| 4,900,848 | 2/1990 | Saito et al. | 525/471 |

FOREIGN PATENT DOCUMENTS 51-129498 11/1976 Japan.

*Primary Examiner*—Earl Nielsen
*Assistant Examiner*—Frederick Krass
*Attorney, Agent, or Firm*—Luther A. R. Hall

[57] ABSTRACT

Heat-curable compositions of matter which are stable on storage and which contain (a) 10–70 parts by weight of an epoxy resin having a functionality of at least 3,
(b) 90–30 parts by weight of an epoxy resin having a functionality of 2–2.5,
(c) a diphenol, the amount of the diphenol being so chosen that 0.6–1.2 hydroxyl equivalents of the diphenol (c) are employed per epoxide equivalent of the epoxy resins (a) and (b), and
(d) 10–150 parts by weight, relative to 100 parts by weight of the components (a) to (c), of a thermoplastic having phenolic end groups and having a glass transition temperature of at least 150° C. which is compatible with the mixture of the components (a) to (c), are particularly suitable for the production of prepregs for fiber-reinforced composite materials or for the production of adhesive films. The cured shaped articles obtained therefrom are distinguished by a high heat distortion point and excellent mechanical strength properties.

15 Claims, No Drawings

CURABLE EPOXY RESIN COMPOSITIONS OF MATTER CONTAINING A THERMOPLASTIC WHICH HAS PHENOLIC END GROUPS

The invention relates to heat-curable compositions of matter which are stable on storage and which contain certain difunctional and polyfunctional epoxy resins, phenolic curing agents and certain thermoplastics having phenolic end groups, and to the use thereof for the production of shaped articles, in particular prepregs for fibre-reinforced composite materials and adhesive films.

A large number of curable epoxy resin compositions of matter also containing, inter alia, phenolic curing agents are known. Thus, for example, Japanese Preliminary Published Specification 76/129,498 describes compositions of matter containing polyfunctional epoxy resins, phenolic curing agents and accelerators and the use thereof for the production of prepregs for special electrical insulating materials. U.S. Pat. No. 4,322,456 discloses mixtures of epoxy resins, phenolic curing agents and accelerators in which the functionality of the epoxy resins and/or of the curing agents is preferably greater than 2 and which are suitable for the production of curable coatings, in particular as powder paints. U.S. Pat. No. 4,288,565 describes mixtures of epoxy resins of high and low epoxide equivalent weight and phenolic curing agents which are, to the extent of at least 30%, compounds having 3 or more hydroxyl groups per molecule.

The present invention relates to heat-curable compositions of matter which are stable on storage and which contain (a) 5–70 parts by weight of an epoxy resin having a functionality of at least 3, (b) 95–30 parts by weight of an epoxy resin having a functionality of 2–2.5, (c) a diphenol, the amount of the diphenol being so chosen that 0.6–1.2 hydroxyl equivalents of the diphenol (c) are employed per epoxide equivalent of the epoxy resins (a) and (b), and (d) 10–150 parts by weight, relative to 100 parts by weight of the components (a) to (c), of a thermoplastic having phenolic end groups and having a glass transition temperature of at least 150° C. which is compatible with the mixture of the components (a) to (c).

Component (d) of the compositions according to the invention must be compatible with the mixture of the components (a) to (c), i.e. it must be soluble within the range of proportions according to the definition in the melt of (a)+(b)+(c).

The compositions according to the invention are suitable for the production of shaped articles, prepregs and adhesive films, and the cured products are distinguished by good resistance to solvents, and excellent thermal and mechanical properties, in particular by a high heat distrotion point, an excellent fracture toughness, flexural strength and impact strength and a very high elongation at break.

The compositions also exhibit excellent processing properties, for example a high degree of homogeneity, a low melt viscosity and a long pot life. After curing, the compositions of matter according to the invention produce crosslinked polymers having properties similar to thermoplastics (high elongation at break, flexural strength and impact strength) without the necessity to accept the difficulties which occur, because of their very high viscosity, when high-molecular thermoplastics are processed. The compositions according to the invention have a relatively low viscosity and can be processed without problems at low temperatures (120° to 200° C.).

Epoxy resins (a) and (b) which are suitable for the present compositions are any resins which have a functionality of at least 3 or 2–2.5 and which can be cured by means of diphenols (c).

Epoxy resins having a functionality of 3, for example, are understood to mean resins which have an average of 3 epoxide groups per molecule.

Examples of resins which are suitable as epoxy resins (a) and (b) are diglycidyl or polyglycidyl ethers of cycloaliphatic polyols, such as 2,2-bis(4'-hydroxycyclohexyl)propane, diglycidyl or polyglycidyl ethers of polyhydric phenols, such as resorcinol, bis(4'-hydroxyphenyl)methane (bisphenol F), 2,2-bis(4'-hydroxyphenyl)propane (bisphenol A), 2,2-bis(4'-hydroxy-3',5'-dibromophenyl)propane or 1,1,2,2-tetrakis(4'-hydroxyphenol)ethane, or condensation products of phenols with formaldehyde, such as phenol novolaks and cresol novolaks; and also di($\beta$-methylglycidyl)-or poly($\beta$-methylglycidyl) ethers of the polyalcohols and polyphenols listed above;

Polyglycidyl esters and poly($\beta$-methylglycidyl) esters of polybasic carboxylic acids, such as phthalic acid, terephthalic acid, tetrahydrophthalic acid and hexahydrophthalic acid;

Glycidyl derivatives of aminophenols, for example triglycidyl-p-aminophenol;

N-glycidyl derivatives of amines, amides and heterocyclic nitrogen bases, such as N,N-diglycidylaniline, N,N-diglycidyltoluidine, N,N,N',N'-tetraglycidyl-bis(4-aminophenyl)methane, triglycidyl isocyanurate, N,N-diglycidyl-N,N'-ethyleneurea, N,N'-diglycidyl-5,5-dimethylhydantoin, N,N'-diglycidyl-5-isopropylhydantoin or N,N'-diglycidyl-5,5-dimethyl-6-isopropyl-5,6-dihydrouracil;

Polyfunctional epoxy resins, such as the 2,6-disubstituted 4-epoxypropylphenyl glycidyl ethers and adducts thereof described in EP 205,409 and EP 204,659;

Bisphenols which are substituted in each case by two glycidyloxy and 2,3-epoxypropyl groups, for example 2,2-bis(3'-epoxypropyl-4'-epoxypropylphenyl)propane, which is described in GB No. 828,364;

Glycidyl derivatives of tetramethylol-substituted cyclohexanols, cyclohexanones, cyclopentanols and cyclopentanones, such as the compounds described in U.S. Pat. No. 4,549,008;

And glycidyloxy-substituted benzophenones and glycidyloxydiketones, such as the compounds described in U.S. Pat. No. 4,649,181.

In general, mixtures of two or more epoxy resins can also be used as component (a) and/or as component (b) in the compositions according to the invention.

Compounds which are particularly suitable as epoxy resins (a) and (b) are those which have an epoxide content of 5–11 equivalents/kg, and are glycidyl ethers, glycidyl esters or N-glycidyl derivatives of a cycloaliphatic, aromatic or heterocyclic compound. Epoxy resins (a) and (b) which are particularly preferred are epoxy novolaks or glycidyl derivatives of a bisphenol, an aromatic diamine, an aminophenol, a hydantoin or a tetramethylolcyclohexane.

Resins suitable as epoxy resin (a) are preferably epoxyphenol novolaks or glycidyl derivatives of an aromatic diamine, an aminophenol or a tetramethylolcyclohexane. They preferably have a functionality of 3 to 4. Resins suitable as epoxy resin (b) are, in particular, epoxyphenol novolaks or glycidyl derivatives of bisphenol A or of bisphenol F. They preferably have a functionality of 2 to 2.2.

Examples of suitable diphenols (c) are mononuclear and polynuclear dihydroxy aromatic compounds which can contain condensed benzene rings. Particularly suitable compounds are those of the formulae I, Ia or II

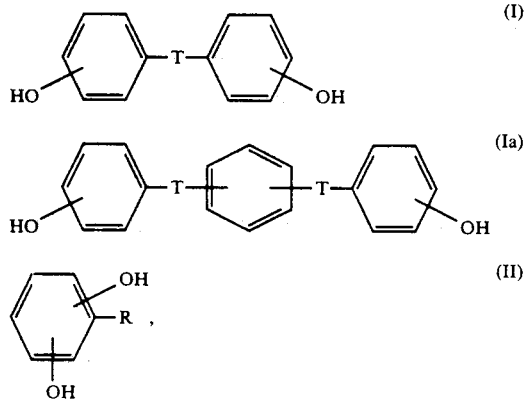

in which T is a direct bond, methylene, isopropylidene, O, S, CO or SO$_2$ and R is hydrogen or C$_1$–C$_4$alkyl, or dihydroxynaphthalene or mixtures of these compounds. Amongst the compounds of the formulae I and Ia, preferred compounds are those in which the hydroxyl groups are attached in the 4,4'-position. Examples of suitable compounds of the formula Ia are compounds in which T is isopropylidene and the benzene rings are in each case substituted in the para-position or in the meta-position. These products are obtainable under the name bisphenol P or bisphenol M from Mitsui Petrochemical. Amongst the compounds of the formula II, 2,6-dihydroxytoluene is preferred.

Diphenols (c) which are particularly preferred are bisphenol A, bisphenol F, bisphenol P, bisphenol M, 4,4'-dihydroxydiphenyl sulfide, 2,6-dihydroxynaphthalene and, in particular, 2,7-dihydroxynaphthalene or 4,4'-dihydroxydiphenyl ether.

A mixture of 2,6-dihydroxytoluene and 2,7-dihydroxynaphthalene is also suitable as a phenolic curing agent. Particularly good results are achieved if equal amounts by weight of these compounds are mixed in the melt at approx. 180° C., the product obtained after the solidification of the melt is ground to give a fine powder and this is then employed as the curing agent.

If it is suitable, the compositions of matter according to the invention can, in addition to the diphenols (c), also contain a certain amount of one or more triphenols or polyphenols, for example 2,4,6-tris[2'-(p-hydroxyphenyl)-2'-propyl]benzene ("tris-TC" made by Mitsui Petrochemical) as curing agent. In general, however, not more than 50%, preferably not more than 30%, of the phenolic hydroxyl groups should originate from a triphenol or polyphenol, and the remainder of the hydroxyl groups should belong to a diphenol. If triphenols or polyphenols are used in addition to the diphenols as component (c), the proportion of the epoxy resin (a) can be reduced and the proportion of the epoxy resin (b) can be increased correspondingly. Phenol novolaks or cresol novolaks are generally not suitable as phenolic curing agents for the compositions according to the invention. It will readily be understood that, if both diphenols and triphenols or polyphenols are used, the amount of the total phenolic curing agent (c) is so chosen that a total of 0.6–1.2 hydroxyl equivalents of the phenols employed is present in the compositions according to the invention per epoxide equivalent of epoxy resins employed.

If it is suitable, the compositions according to the invention can contain, in addition to the components (a) to (d), also (c1) 0.05–5% by weight of an accelerator, relative to the epoxy resins (a) and (b). Compositions which do not contain an N-glycidyl derivative either as the epoxy resin (a) or as the epoxy resin (b) preferably contain an accelerator (c1) in addition to the diphenols (c).

Accelerators (c1) suitable for the curable compositions of matter are all the compounds known to those skilled in the art for accelerating the crosslinking reaction of epoxy resins by phenolic curing agents, for example tertiary amines, salts thereof or quaternary ammonium compounds, such as tetramethylammonium chloride, phosphonium salts, alkali metal alcoholates, for example sodium hexanetriolate, Lewis acids, for example BF$_3$ or SnCl$_4$, and nitrogen-containing heterocyclic compounds, such as pyridines, imidazoles and derivatives thereof. Imidazoles and N-acylimidazoles (imidazolides) are particularly suitable as accelerators (c1).

Examples of suitable imidazoles are compounds of the formula III

in which the substituents $R^a$ independently of one another are hydrogen, C$_1$–C$_{12}$alkyl, C$_5$–C$_{10}$cycloalkyl or C$_6$–C$_{10}$aryl. 2-Methylimidazole, 2-ethylimidazole, 2-phenylimidazole and 2-ethyl-4-methylimidazole are particularly preferred.

Examples of suitable N-acylimidazoles (imidazolides) are the compounds described in U.S. Pat. No. 4,436,892, U.S. Pat. No. 4,587,311 and Japanese Preliminary Published Application No. 74/7599. Particularly suitable compounds are those of the formula IV

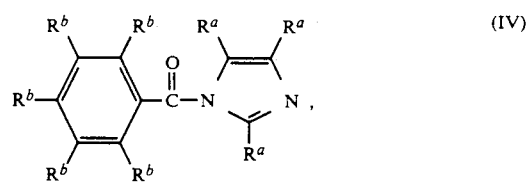

in which $R^a$ is as defined above and the substituents $R^b$ independently of one another are hydrogen, C$_1$–C$_{12}$alkyl, halogen, nitro or trifluoromethyl. Examples of suitable imidazolides are 1-(2',4',6'-trimethylbenzoyl)-2-ethylimidazole, 1-(2',6'-dichlorobenzoyl)-2-methylimidazole, 1-(2',4',6'-trimethylbenzoyl)-2-methylimidazole and 1-(2',4',6'-trimethylbenzoyl)-2-phenylimidazole.

If it is suitable, the compositions according to the invention can, in addition to the components (a) to (d) also contain (e) a thermoplastic which has no phenolic end groups and has a glass transition temperature of at least 180° C., the total amount of the thermoplastic components (d) and (e) being 10–150 parts by weight, relative to 100 parts by weight of the components (a) to (c), and (d) preferably making up at least 30% by weight, in particular 40–70% by weight, of the components (d) and (e).

All the known polymers which have a sufficiently high glass transition temperature, ie. ≧180° C., and are miscible with the epoxy resin/curing agent system according to the application can be employed as thermoplastics (e) in the curable compositions of matter according to the invention. By virtue of their properties, polysulfones, polyether-sulfones, polyimides, polyether-imides, polyethers or polyether-ketones are particularly suitable as thermoplastics. The glass transition temperature of the thermoplastic is preferably within the range from 180° to 450° C. In this regard, thermoplastics having a glass transition temperature of 180 to 350, particularly 190° to 250° C., are particularly preferred. If polyether-imides are used, polymers having a $T_g$ of 220° to 250° C. are particularly preferred, and if polyimides are used those having a $T_g$ of 280° to 340° C. are particularly preferred. The thermoplastics (e) preferably have a molecular weight of 20,000–100,000, in particular 20,000–70,000, and a glass transition temperature of 240–450, in particular 300°–420° C.

If a polysulfone is employed as the thermoplastic (e), examples of suitable compounds are those having the recurring unit of the formula $$-A-SO_2-$$

in which A is a divalent aromatic group which can be interrupted by ether oxygen atoms and/or divalent aliphatic groups.

The polysulfones to be employed can be obtained in a known manner, for example by heating either (a) a sulfonyl halide of the formula $HA_1SO_2X$ or (b) a mixture of a disulfonyl halide of the formula $XSO_2A_1SO_2X$ with a compound of the formula $HA_2H$ which is free from sulfonyl halides and in which $A_1$ and $A_2$ are identical or different and are in each case a divalent aromatic group which can be interrupted by ether oxygen atoms and/or divalent aliphatic groups and X is a chlorine or bromine atom, in an inert solvent in the presence of a Lewis acid catalyst. The polysufones prepared by process (a) contain the recurring unit $$-A_1-SO_2-,$$

whereas the polysulfones prepared by process (b) contain the recurring unit $$-A_1-SO_2-A_2-SO_2-$$

Polysulfone resins which are preferably used in the compositions according to the invention are those which contain ether groups in the recurring unit, but are free from lateral hydroxyl groups. These are particularly polysulfones having a recurring unit of the formula $$-OA_3OA_4SO_2A_4-,$$

in which $A_3$ and $A_4$ are divalent arylene, especially phenylene, groups, which can be substituted by chlorine or $C_1$–$C_4$alkyl, for example methyl, groups. Polysulfones of this type are obtained in a manner known per se by reacting a dialkali metal salt of a dihydric phenol of the formula $HOA_3OH$ with a bis-(monochloroaryl) sulfone of the formula $ClA_4SO_2A_4Cl$ in dimethyl sulfoxide. Polysulfone resins which are more preferred are those having a recurring unit of the formula $$-OA_5-Y^a-A_5OA_6-SO_2-A_6-$$

in which $A_5$ and $A_6$ are each a phenylene group which is unsubstituted or substituted by chlorine or $C_1$–$C_4$alkyl groups, for example methyl groups, and $Y^a$ is a carbon-carbon bond, the $-SO_2-$ group or an aliphatic hydrocarbon group, in particular a group of this type which has not more than 4 carbon atoms, for example groups of the formula

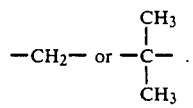

Thermoplastic polysulfone resins which are particularly preferred are those having recurring units of the formula V

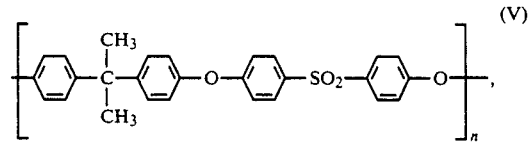

in which n preferably has an average value of 50–120.

Examples of particularly advantageous polysulfones are the compounds obtainable from Union Carbide Corporation, for example "Polysulfone Udel P1800", which according to the manufacturers, has a melting point within the range from 350° to 370° C., a heat distortion point (ASTM specification D648) of 175° C. and contains on average 50–80 recurring units of the formula V per molecule, it being possible to assume a molecular weight range of approximately 22,000–35,000.

A similar substance obtainable from Union Carbide Corporation under the name "Polysulfone P2300" is also suitable; according to the manufacturer this has a molecular weight range of 30,000–50,000, and it is possible to assume that the substance contains on average about 68–113 recurring units of the formula V per molecule, and also a similar substance obtainable from Union Carbide Corporation under the name "Polysulfone P3500"; according to the manufacturer this has a molecular weight range which is between that of "Polysulfone Udel P1800" and that of "Polysulfone P2300"; its molecular weight is approx. 35,000.

In accordance with the invention it is also possible to use as component (e) mixtures of two or more thermoplastics.

Particularly suitable thermoplastics (e) are polyimides, such as polyimides containing phenylindane units, such as are described, for example, in U.S. Pat. No. 3,856,752 and EP-A 92,524, in particular those having a glass transition temperature of about 305° C. and an average molecular weight of approx. 65,000, for example Matrimid ® 5218 made by Ciba-Geigy, homopolyimides and copolyimides formed from at least one aromatic tetracarboxylic acid and at least one aromatic diamine, as disclosed, for example, in U.S. Pat. No. 4,629,777, and homopolyimides and copolyimides such as are described, for example, in EP-A 162,017, EP-A 181,837 and U.S. Pat. No. 4,629,685.

Preferred thermoplastics (e) are also polyetherimides, for example the products made by General Electric which are available under the name Ultem ® (for example as Ultem ® 1000). Other preferred thermoplastics are polyether sulfones, for example Victrex PES 100 P made by ICI or Udel P 1800 made by Union Carbide.

Thermoplastics having phenolic end groups (d) which can be employed in the compositions according to the invention are all the known polymers which have a sufficiently high glass transition temperature, i.e. $\geq 150°$ C., and are miscible with the epoxide resin/curing agent system according to the application. As stated above for thermoplastics (e), polysulfones, polyethersulfones, polyimides, polyether-imides, polyethers or polyether-ketones are particularly suitable by virtue of their properties.

The thermoplastics having phenolic end groups (d) preferably have a molecular weight of 2,000–100,000, in particular 5,000–30,000.

Examples of suitable polyimides having phenolic end groups are the compounds described in U.S. Pat. No. 4,026,871.

A suitable polyether-sulfone is the product made by BASF marketed under the name Ultrason ® 49K.

The thermoplastic having phenolic end groups (d) in the compositions of matter according to the invention is preferably a polyether-sulfone, a polyimide or a polyether-imide. Particularly suitable polyimides or polyether-imides are compounds which contain, as the diamine, a phenylindanediamine and/or a 2,2'-bis-(aminophenoxy)-biphenyl.

The polyimides or polyether imides mentioned last are embraced below by the polymers of the formula VI.

Suitable components (d) in the compositions of matter according to the invention are also nitrogen-containing polymers with terminal hydroxyl groups of the formula VI

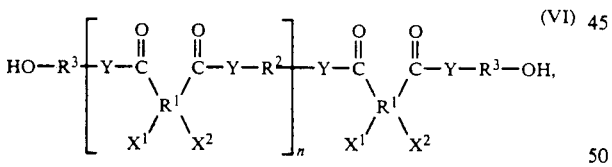
(VI)

in which $X^1$ and $X^2$ independently are —H or

Z is OH and Y is NH or Z and Y together are N, n is an integer from 1 to 2000, $R^1$ is a radical containing at least one aromatic ring, the carbonyl groups being attached to different carbon atoms in the ring, and, if at least one of $X^1$ and $X^2$ is the group

this group is located in each case in the ortho-position or peri-position relative to the carbonyl group, so that five-membered or six-membered imide rings are formed in a cyclization reaction, $R^2$ is an aliphatic radical having at least 2 C atoms, a cycloaliphatic, araliphatic, carboxylic-aromatic or heterocyclic-aromatic radical, at least 10 mol % of the radicals $R^2$ being a radical of the formula VII and/or VIII

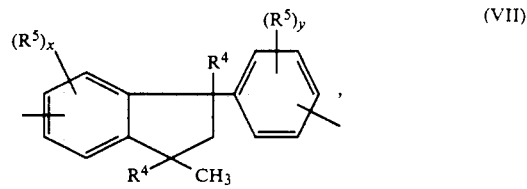
(VII)

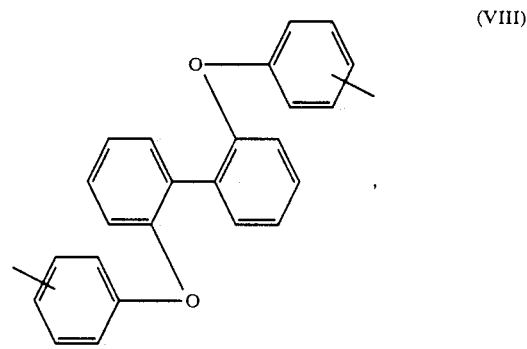
(VIII)

in which $R^4$ is H or $C_1$–$C_4$alkyl, the radicals $R^5$ independently of one another are hydrogen, halogen or $C_1$–$C_4$alkyl, x is zero or an integer from 1 to 3 and y is zero or an integer from 1 to 4, and $R^3$ is a divalent aromatic radical having 6–12 C atoms or a radical of the formula IX

(IX)

in which $T^1$ is a direct bond, methylene, isopropylidene, O, CO, NH, S or $SO_2$.

In general, the polymers of the formula VI have an intrinsic viscosity of 0.1 to 2.0, preferably 0.2 to 1.5 and particularly 0.2 to 0.8, dl/g.

It is generally known that the intrinsic viscosity is a measure of the molecular weight of polymers. The values of the intrinsic viscosity indicated, from 0.1 to 2.0, correspond to an average molecular weight of about $10^3$ to $10^6$.

Polymers of the formula VI in which n is an integer from 2 to 200, particularly 2 to 50, are preferred.

Polymers of the formula VI in which at least 30 mol %, in particular at least 50 mol %, of the radicals $R^2$ are a group of the formula VII and/or VIII are also preferred.

In the recurring structural elements of the formula VIa

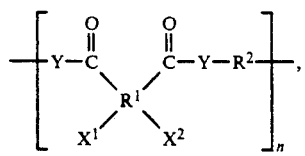 (VIa)

of the polymers of the formula VI, R¹, R², X¹, X² and Y can have various meanings. The polymers of the formula VI are thus homopolymers or copolymers having a statistical distribution of individual structural elements in which R¹, R², X¹, X² and Y have various meanings.

In the structural element of the formula VIa X¹ and X² are preferably in each case a group

In this regard, cyclized derivatives in which Z and Y together are N are particularly preferred. Amongst the polymers of the formula VI polyimides having terminal hydroxyl groups of the formula X

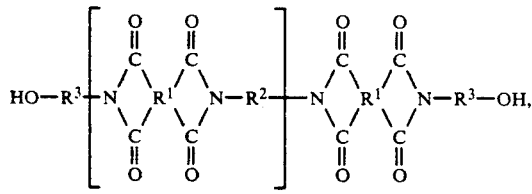 (X)

in which $R^1$, $R^2$, $R^3$ and n are as defined above, are therefore preferred.

The radicals $R^1$ of the polymers of the formula VI are derived from di-, tri- or tetra-carboxylic acids. In principle, any di-, tri or tetra-carboxylic acid which, after the removal of the carboxyl groups, gives the radicals $R^1$ according to the definition is suitable.

The radical $R^1$ can, for example, be a carbocyclic-aromatic or heterocyclic-aromatic radical or a radical which, in addition to aromatic rings, also contains a cycloaliphatic ring, for example a phenylindane radical.

As a carbocyclic-aromatic radical, $R^1$ preferably has at least one 6-membered ring; in particular these radicals are monocyclic, condensed polycyclic or polycyclic radicals having several cyclic, condensed or non-condensed systems which can be attached to one another directly or via bridge members. Examples of suitable bridge members which may be mentioned are

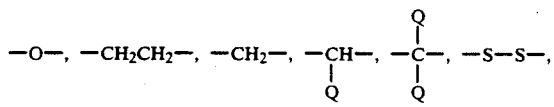

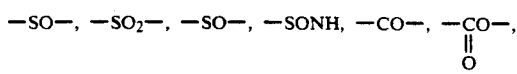

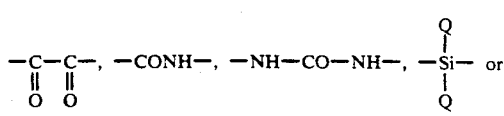

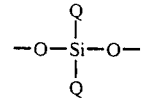

in which Q is an alkyl group having 1-6, preferably 1-4, carbon atoms or a phenyl group.

If $R^1$ is a heterocyclic-aromatic radical, suitable examples are especially 5-membered or 6-membered heterocyclic-aromatic ring systems which can be benzo-condensed and contain O, N and/or S.

Carbocyclic-aromatic or heterocyclic-aromatic radicals $R^1$ can also be substituted, for example by nitro groups, alkyl groups having 1-4 carbon atoms, trifluoromethyl groups, halogen atoms, in particular chlorine, or silyl, sulfonic acid or sulfamoyl groups.

$R^1$ is preferably an unsubstituted monocyclic aromatic radical, a condensed bicyclic aromatic radical or a non-condensed bicyclic aromatic radical, the aromatic nuclei being attached to one another in the latter case via the bridge member $-CH_2-$, $-O-$, $-CO-$ or $-SO_2-$, or is a tetravalent radical of the formula XI

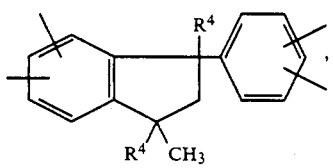 (XI)

in which $R^4$ is as defined above.

Examples of suitable di-, tri- and tetra-carboxylic acids or anhydrides thereof from which $R^1$ can be derived are phthalic acid, terephthalic acid, isophthalic acid, 4,4'-dicarboxydiphenyl ether, naphthalene-2,6-dicarboxylic acid, thiophene-2,5-dicarboxylic acid, pyridine-2,3-dicarboxylic acid, trimellitic anhydride, pyromellitic dianhydride, 2,3,9,10-perylenetetracarboxylic dianhydride, 1,4,5,8-naphthalenetetracarboxylic dianhydride, 2,6-dichloronaphthalene-1,4,5,8-tetracarboxylic dianhydride, 2,7-dichloronaphthalene-1,4,5,8-tetracarboxylic dianhydride, 2,3,6,7-tetrachloronaphthalene-1,4,5,8-tetracarboxylic dianhydride, phenanthrene-1,8,9,10-tetracarboxylic dianhydride, 2,3,3',4'-benzophenonetetracarboxylic dianhydride, 3,3',4,4'-benzophenonetetracarboxylic dianhydride, 2,2'3,3'-benzophenonetetracarboxylic dianhydride, 3,3',4,4'-biphenyltetracarboxylic dianhydride, 2,2',3,3'-biphenyltetracarboxylic dianhydride, 4,4'-isopropylidenediphthalic acid dianhydride, 3,3'-isopropylidenediphthalic acid dianhydride, 4,4'-oxydiphthalic acid dianhydride, 4,4'-sulfonyldiphthalic acid dianhydride, 3,3'-oxydiphthalic acid dianhydride, 4,4'-methylenediphthalic acid dianhydride, 4,4'-thiodiphthalic acid dianhydride, 4,4'-ethylidenediphthalic acid dianhydride, 2,3,6,7-naphthalenetetracarboxylic dianhydride, 1,2,4,5-naphthalenetetracarboxylic dianhydride, 1,2,5,6-naphthalenetetracarboxylic dianhydride, benzene-1,2,3,4-tetracarboxylic dianhydride, pyrazine-2,3,5,6-tetracarboxylic dianhydride and thiophene-2,3,4,5-tetracarboxylic dianhydride.

Phenylindanedi-, phenylindanetri- and phenylindanetetracarboxylic acids, in particular phenylindane dianhydrides of the formula XIa

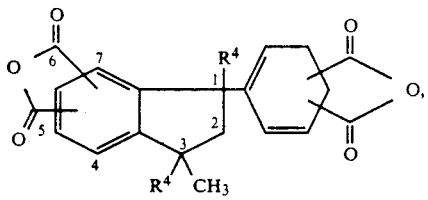 (XIa)

in which $R^4$ is hydrogen or $C_1$–$C_4$ alkyl, are also particularly suitable.

The following are examples of such dianhydrides: 1-(3',4'-dicarboxyphenyl)-1,3,3-trimethylindane-5,6-dicarboxylic dianhydride, 1-(3',4'-dicarboxyphenyl)-1,3,3-trimethylindane-6,7-dicarboxylic dianhydride, 1-(3',4'-dicarboxyphenyl)-3-methylindane-5,6-dicarboxylic dianhydride and 1-(3',4'-dicarboxyphenyl)-3-methylindane-6,7-dicarboxylic dianhydride. Phenylindane dianhydrides of this type and their preparation are described in U.S. Pat. No. 3,577,442.

Polymers of the formula VI in which $R^1$ is a radical of the formula XI having $R^4$ equal to methyl, or is a radical of the formula XII

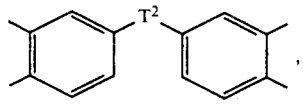 (XII)

in which $T^2$ is $CH_2$, O, $SO_2$ or especially CO, are particularly preferred.

The radical $R^2$ of the polymers of the formula VI is, to the extent of at least 10 mol %, a group of the formula VII and/or VIII. This radical is derived from the corresponding diamines, from a phenylindanediamine or from a 2,2'-bis-(aminophenoxy)-biphenyl. The remaining fraction, i.e. not more than 90 mol %, of the diamine component $H_2N$—$R^2$—$NH_2$ can be any diamine from which the radical $R^3$ according to the definition is derived.

Polymers which contain, as $R^2$, both the radical of the formula VII and the radical of the formula VIII, in particular those in which $R^2$ is solely groups of the formula VII and the formula VIII, are preferred. In this case the radicals $R^2$ preferably consist of 20–99 mol %, in particular 60–99 mol %, of groups of the formula VII and 80–1 mol %, in particular 40–1 mol %, of groups of the formula VIII. Polymers in which $R^2$ consists of 90–99 mol % of groups of the formula VII and 10–1 mol % of groups of the formula VIII are most preferred.

The phenylindanediamine component of the polymers of the formula VI can consist of any combination of isomers of the diamino compounds designated by the formula VIIa

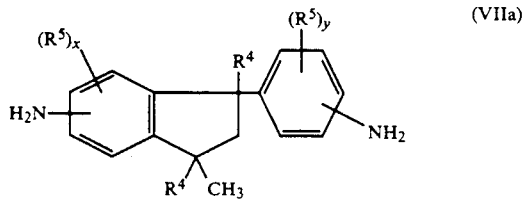 (VIIa)

in which $R^4$, $R^5$, x and y are as defined above.

The phenylindanediamine component can contain, for example, 0 to 100% by weight of 5-amino-1-(4'-aminophenyl)-1,3,3-trimethylindane in combination with 100 to 0% by weight of 6-amino-1-(4'-aminophenyl)-1,3,3-trimethylindane. Furthermore, one or both of these isomers can be replaced within the whole range from 0 to 100% by weight by any substituted diamino isomer designated by the formula VIIa. Examples of such substituted diamino isomers are 5-amino-6-methyl-1-(3'-amino-4'-methylphenyl)-1,3,3-trimethylindane, 5-amino-1-(4'-amino-Ar',Ar'-dichlorophenyl)-Ar,Ar-dichloro-1,3,3-trimethylindane, 6-amino-1-(4'-amino-Ar',Ar'-dichlorophenyl)-Ar,Ar-dichloro-1,3,3-trimethylindane, 4-amino-6-methyl-1-(3'-amino-4'-methylphenyl)-1,3,3-trimethylindane and Ar-amino-1-(Ar'-amino-2',4'-dimethylphenyl)-1,3,3,4,6-pentamethylindane. In the compounds mentioned above, Ar and Ar' designate undetermined positions of the corresponding substituents in the phenyl rings.

Amongst the phenylindanediamines of the formula VIIa preferred diamines are those in which $R^4$ is hydrogen or methyl and the $R^5$s independently of one another are methyl, chlorine or bromine and the amino groups are in position 5, 6 or 7 and in position 3' or 4'. Phenylindanediamines of the formula VIIa in which $R^4$ is methyl, x and y are each zero and the amino groups are in position 5 or 6 and in position 4' are most preferred.

Various polyimides based on phenylindanediamines and methods of synthesizing them are described in detail in U.S. Pat. No. 3,856,752, which thereby is a part of the present application.

2,2'-Bis(aminophenoxy)biphenyls of the formula VIIIa

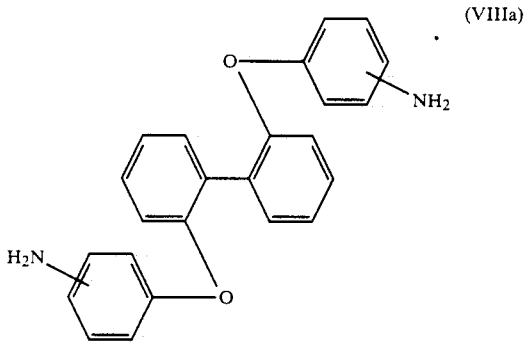 (VIIIa)

and the preparation thereof are described in U.S. Pat. No. 4,196,144. In accordance with the invention it is preferable to employ, as the diamine component, diamines of the formula VIIIa in which the two amino groups are each in the ortho-position and particularly in the para-position of the benzene ring.

Aliphatic, araliphatic, cycloaliphatic, carbocyclic-aromatic or heterocyclic-aromatic radicals which are represented by $R^2$ can be unsubstituted or substituted, for example by halogen atoms, such as fluorine, chlorine or bromine, or by alkyl or alkoxy groups having 1–4 carbon atoms in each case.

Suitable aliphatic radicals $R^2$ are, in particular, linear or branched alkylene groups having 2–12 carbon atoms, it being also possible for the alkylene chain to be interrupted by heteroatoms, such as O, S or N atoms.

Examples of $R^2$ as a cycloaliphatic radical are the 1,3-cyclohexylene, 1,4-cyclohexylene, 1,4-bis(methylene)cyclohexane or dicyclohexylmethane group, whereas suitable araliphatic radicals are, in particular, 1,3-, 1,4- or 2,4-bis(alkylene)benzene radicals, 4,4'-bis- (alkylene)diphenyl radicals and 4,4'-bis(alkylene)diphenyl ether radicals.

As a carbocyclic-aromatic radical, $R^2$ is preferably a monocyclic radical, a fused polycyclic radical or a non-fused, bicyclic aromatic radical, in the latter case the aromatic nuclei being attached to one another via a bridge member. Examples of suitable bridge members are the radicals designated above as $T^1$ in formula IX.

As a heterocyclic-aromatic radical, $R^2$ is, in particular, a heterocyclic-aromatic, 5-membered or 6-membered ring, containing O, N and/or S.

Examples of suitable diamines $H_2N-R^2-NH_2$ are o-, m- and p-phenylenediamine diaminotoluenes, such as 2,4-diaminotoluene, 1,4-diamino-2-methoxybenzene, 2,5-diaminoxylene, 1,3-diamino-4-chlorobenzene, 4,4'-diaminodiphenylmethane, 4,4'-diaminodiphenyl ether, 4,4'-diaminodiphenyl thioether, 4,4'-diaminodiphenyl sulfone, 2,2'-diaminobenzophenone, 1,8-diaminonaphthalene, 1,5-diaminonaphthalene, 2,6-diaminopyridine, 1,4-piperazine, 2,4-diaminopyrimidine, 2,4-diamino-s-triazine, di-, tri-, tetra-, hexa-, hepta-, octa- and decamethylenediamine, 2,2-dimethylpropylenediamine, 2,5-dimethylhexamethylenediamine, 4,4-dimethylheptamethylenediamine, 3-methylheptamethylenediamine, 3-methoxyhexamethyldiamine, 2,11-diaminododecane, 2,2,4-trimethylhexamethylenediamine, 2,4,4-trimethylhexamethylenediamine, 1,2-bis(3-aminopropoxy)ethane, N,N'-dimethylethylenediamine, N,N'-dimethyl-1,6-diaminohexane and the diamines of the formulae $H_2N(CH_2)_3O(CH_2)_2O(CH_2)_3NH_2$ and $H_2N(CH_2)_3S(CH_2)_3NH_2$; 1,4-diaminocyclohexane, 1,4-bis-(2-methyl-4-aminopentyl)-benzene and 1,4-bis-(aminomethyl)-benzene.

Diamine components which are particularly preferred are carbocyclic-aromatic diamines, in particular substituted dinuclear diamines, for example bis(4-amino-3,5-dialkylphenyl)methanes or bis(4-amino-3-chloro-5-alkylphenyl)methanes. These compounds are described, for example, in EP-A 171,588. Examples of suitable diamines of this type are bis(3-methyl-4-amino-5-ethylphenyl)methane, bis(3-methyl-4-amino-5-isopropylphenyl)methane, bis(3,5-diisopropyl-4-aminophenyl)methane, bis(2-chloro-3,5-diethyl-4-aminophenyl)methane, bis(3-ethyl-4-amino-5-sec.-butylphenyl)methane, bis(2,6-dichloro-3,5-diethyl-4-aminophenyl)methane and, in particular, bis(3,5-diethyl-4-aminophenyl)methane.

The radical $R^3$ of the polymers according to the invention is derived from aminophenols of the formula XVI, $H_2N-R^3-OH$. As a divalent, aromatic radical having 6-12 C atoms, $R^3$ can be unsubstituted or can contain one or more $C_1-C_4$alkyl groups or halogen atoms, especially chlorine or bromine, as substituents.

Preferred polymers are those in which $R^3$ is 1,2-, 1,3- or 1,4-phenylene or a radical of the formula IX in which the free bonds are in the 4,4'-position. It is particularly preferable for $R^3$ to be a radical of the formula

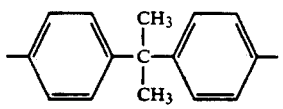

or, in particular, 1,4-phenylene.

The polymers of the formula VI, the polyamides, polyamide-amic acids and polyamic acids containing hydroxyl end groups and also the derivatives which have been cyclized to give the corresponding polyamide-imide or polyimide can be prepared by reacting a diamine of the formula XIII $$H_2N-R^2-NH_2 \qquad \text{(XIII)}$$

with an amide-forming derivative of a di-, tri- or tetracarboxylic acid of the formula XIV

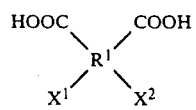

(XIV)

to give a polymer of the formula XV

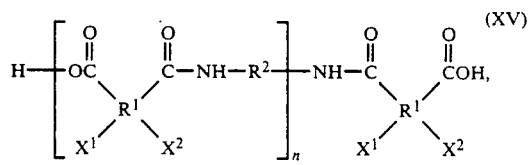

(XV)

and subsequently reacting this polymer or an amide-forming derivative thereof with an aminophenol of the formula XVI $$H_2N-R^3-OH \qquad \text{(XVI)},$$

if appropriate followed by cyclizing the polymers thus obtained to give the corresponding imides, if $X^1$ and/or $X^2$ are

the compounds of the formulae XIII, XIV, XV and XVI being employed in each case in an essentially stoichiometric ratio and $R^1$, $R^2$, $R^3$, $X^1$, $X^2$, Z and n being as defined above.

Examples of suitable amide-forming derivatives of the carboxylic acids of the formulae XIV or XV are esters, halides, such as chlorides, or anhydrides thereof.

In general, the reaction indicated above is carried out in a customary inert organic solvent, preferably in a polar, aprotic solvent, for example dimethyl sulfoxide, N,N-dimethylformamide, N,N-dimethylacetamide, N,N-diethylacetamide, tetramethylurea, N-methylcaprolactam, N-methyl-2-pyrrolidone, acetone, dioxane, ethyl acetate or tetrahydrofuran. Temperatures from about $-20°$ C. to about $50°$ C. are used in this reaction.

The possible cyclization of the polyamide-amic acids or polyamic acids thus obtained is effected chemically or by heat in a manner known per se.

Chemical cyclization is preferably carried out by treatment with a dehydrating agent on its own or mixed with a tertiary amine. Examples of suitable dehydrating agents are acetic anhydride, propionic anhydride and dicyclohexylcarbodiimide or a mixture of acetic anhydride and triethylamine.

Thermal cyclization is carried out by heating at temperatures from about $50°$ C. to $300°$ C., preferably about $150°$ C. to $250°$ C., and, if appropriate, with the addition of an inert organic solvent.

The components (a) to (e) employed in the compositions according to the invention are, with the exception of the polymers of the formula VI, entirely known compounds and can be prepared in a known manner.

Curable compositions according to the invention which are particularly preferred are those containing 15 to 50 parts by weight of the epoxy resin (a), 85 to 50 parts by weight of the epoxy resin (b), such an amount of the diphenol (c) that 0.7-1.1, preferably 0.8-1.0, hydroxyl equivalents of the diphenol are employed per epoxide equivalent of the resins (a) and (b), if appropriate 0.1-1% by weight of the acclerator (c1), relative to the amount of (a) and (b), and 20-130, preferably 30-120 and particularly 70-120, parts by weight of the thermoplastic (d) and, if appropriate, (e), relative to 100 parts by weight of the components (a) to (c).

Amongst the compositions according to the invention which additionally contain the thermoplastic component (e), preferred compositions are those in which both the component (d) and the component (e) are thermoplastics of the same type, for example both polyimides or polyether-sulfones. Since the thermoplastics having phenolic end groups (d) can react with epoxy resins via these groups, single-phase, homogeneous products are formed after curing. Curable compositions having improved compatibility of the thermoplastic component (e) with the epoxy resin system result if non-reactive thermoplastics (e) of the same type as (d) are used.

In addition it is particularly advantageous that the molecular weight of the component (d) can be varied as desired without losses in the toughness properties of the crosslinked products obtainable from the compositions according to the invention. The use of thermplastics (d) having a lower molecular weight (for example below 30,000) sometimes brings advantages when the compositions are applied, since the latter are distinguished by a particularly low melt viscosity. In the case of thermoplastics without end groups reactive towards the epoxy resins, the use of relatively short-chain polymers of a fairly low molecular weight results in brittle products which are scarcely usable, whereas high-molecular thermoplastics, on account of their high melt viscosity, cause problems when the compositions of matter are processed.

The compositions according to the invention can be prepared by good mixing or mutual dissolution of all the components, it being possible to add the individual components in various sequences. The thermoplastic can, for example, be dissolved by heating in the epoxy resin and in the phenolic curing agent, and the accelerator and, if appropriate, further additives can be added after cooling. It is also possible, however, to prepare a solution of the thermoplastic (d) and, if appropriate, (e) in an inert solvent, for example methylene chloride, and to mix this solution with the epoxy resin/curing agent mixture.

The compositions according to the invention can be used in a versatile manner and are suitable for use, for example, as casting resins, laminating or impregnating resins, moulding compositions, sealing compositions, potting and insulating compositions for electrical engineering and, preferably, as adhesives and as matrix resins for composite materials, especially for the production of fibre-reinforced plastics.

If desired, especially when modifying agents are concomitantly used, the compositions according to the invention can be dissolved in an organic solvent, such as toluene, xylene, methyl ethyl ketone, methylene chloride or a similar solvent or solvent mixture customary in the paint industry. Solutions of this type are particularly suitable for use as impregnating agents or coating agents.

It is also possible to add to the curable compositions according to the invention, prior to curing and in any phase, customary modifying agents, such as extenders, fillers, reinforcing agents, pigments, dyes, organic solvents, plasticizers, flow control agents, thixotropic agents, flame-retarding substances or mould release agents. The following may be mentioned as examples of extenders, reinforcing agents, fillers and pigments which can be employed in the curable compositions according to the invention: liquid coumarone-indene resins, textile fibres, glass fibres, asbestos fibres, boron fibres, carbon fibres, polyethylene powders, polypropylene powders, ground quartz, mineral silicates, such as mica, ground asbestos, ground shale, kaolin, ground chalk, antimony trioxide, bentone, lithopone, barytes, titanium dioxide, carbon black, graphite, oxide colours, such as iron oxide, or metal powders, such as aluminium powder or iron powder. If the compositions according to the invention are employed for the production of prepregs, it is particularly desirable to add short fibres.

Examples of flow control agents which can be added if the curable compositions are specifically used in surface protection are silicones, liquid acrylic resins, cellulose acetobutyrate, polyvinyl butyral, waxes, stearates etc (these are in part also used as mould-release agents).

Examples of plasticizers which can be employed for modifying the curable mixtures are dibutyl, dioctyl and dinonyl phthalate, tricresyl phosphate, trixylenyl phosphate and diphenoxyethyl formal.

The compositions according to the invention are preferably cured by heating them at a temperature within the range from 120° to 250° C., in particular 160° to 220° C. It is also possible to carry out the curing in a known manner in two or several steps, in which the first curing step is carried out at low temperature and the postcuring at higher temperature.

If desired, active thinners, for example neopentyl glycol diglycidyl ether, butanediol diglycidyl ether or hexanediol diglycidyl ether, can be added to the curable compositions to lower their viscosity.

The present invention also relates to the use of the compositions according to the invention for the production of cured shaped articles and to their use for the production of prepregs for fibre-reinforced composite materials or for the production of adhesive films. The prepregs and the adhesive films can be produced in a manner known per se, for example in an impregnating process in the presence of one of the solvents mentioned above or a halogenated solvent, for example methylene chloride, or in the so-called hot melt process.

The moulding materials according to the invention are distinguished, in general, by high glass transition temperatures together with high mechanical strength values at the same time, and, in particular, by an excellent fracture toughness, flexural strength and impact strength as well as a very high elongation at break.

The following examples illustrate the invention.

I. PREPARATION EXAMPLES

Example 1: Synthesis of a Polyether Imide Having Phenolic end Groups (Formula Molecular Weight 20,000)

| | Ingredients taken: |
|---|---|
| I | 4.49 g (0.0122 mol, 5 mol %) of 2,2'-bis-(p-aminophenoxy)-biphenyl, |
| II | 61.49 g (0.2317 mol, 95 mol %) of 5(6)-amino-1-(4'-aminophenyl-1,3,3-trimethylindane (mixture of isomers), |
| III | 80.56 g (0.250 mol) of 3,3',4,4'-benzophenonetetracarboxylic dianhydride, |
| IV | 1.33 g (0.0122 mol) of 4-aminophenol, |
| V | 1300 ml of N,N-dimethylacetamide, |
| VI | 63.8 g (0.625 mol) of acetic anhydride and |
| VII | 12.65 g (0.125 mol) of triethylamine. |

I, II and V are initially placed, under nitrogen, in a 2.51 sulfonation flask equipped with a thermometer, a glass propellor stirrer, a condenser, a cooling bath and an $N_2$ connection, and the resulting clear, pale red-brown solution is cooled to $-15°$ C. III is then introduced into the solution, and the resulting suspension is stirred for a further 2 hours while being slowly heated to 12° C. A yellowish solution is formed. IV is added to this and the mixture is stirred for a further hour. In the course of this the temperature rises from 13° to 19° C. VI and VII are added at 19° C. In the course of this the temperature rises to 27° C. The mixture is stirred for approx. 19 hours at room temperature. The polyimide is isolated by pouring the reddish-yellow solution into water (mixer) and washing it with water and ethanol. The product (a pale yellow, fine powder) is dried in vacuo at 70°–80° C. Yield 138.7 g (94% of theory).

Characterization of the products:

$\eta_{intr}$: 0.673 dl/g (0.5% in N,N-dimethylacetamide at 25° C.).

Example 2: Synthesis of a Polyether Imide Having Phenolic End Groups (Formula Molecular Weight 12,500)

Example 1 is repeated, using the educts listed below. Since the amount of 4-aminophenol is somewhat greater compared with the two diamines, a polyether-imide of a lower molecular weight (lower $\eta_{intr}$) is obtained.

| | Ingredients taken: |
|---|---|
| I | 4.42 g (0.0120 mol, 5 mol %) of 2,2'-bis-(p-aminophenoxy)-biphenyl, |
| II | 60.60 g (0.2284 mol, 95 mol %) of 5(6)-amino-1-(4'-aminophenyl-1,3,3-trimethylindane (mixture of isomers) |
| III | 80.56 g (0.250 mol) of 3,3',4,4'-benzophenonetetracarboxylic anhydride |
| IV | 2.10 g (0.0192 mol) of 4-aminophenol |
| V | 1300 ml of N,N-dimethylacetamide |
| VI | 63.8 g (0.625 mol) of acetic anhydride and |
| VII | 12.65 g (0.125 mol) of triethylamine |

Yield 139.8 g (95% of theory).

$\eta_{intr}$: 0.426 dl/g (0.5% in N,N-dimethylacetamide at 25° C.).

Example 3: Synthesis of a Polyether Imide Having Phenolic End Groups (Formula Molecular Weight 5,000)

Example 1 is repeated using the educts listed below. A further increase in the amount of 4-aminophenol results in a polyether imide of an even lower molecular weight.

| | Ingredients taken: |
|---|---|
| I | 4.14 g (0.0113 mol, 5 mol %) of 2,2'-bis-(p-aminophenoxy)-biphenyl |
| II | 56.71 g (0.2138 mol, 95 mol %) of 5(6)-amino-1-(4'-aminophenyl-1,3,3-trimethylindane (mixture of isomers) |
| III | 80.56 g (0.250 mol) of 3,3',4,4'-benzophenonetetracarboxylic anhydride |
| IV | 5.46 g (0.050 mol) of 4-aminophenol |
| V | 1300 ml of N,N-dimethylacetamide |
| VI | 63.8 g (0.625 mol) of acetic anhydride and |
| VII | 12.65 g (0.125 mol) of triethylamine |

Yield 133.2 g (91% of theory).

$\eta_{intr}$: 0.223 dl/g (0.5% in N,N-dimethylacetamide at 25° C.).

Example 4: Synthesis of a Polyether Imide Having Phenolic End Groups (Formula Molecular Weight 12,500)

Example 1 is repeated using the educts listed below. The diamines I and II are employed in equimolar amounts.

| | Ingredients taken: |
|---|---|
| I | 43.80 g (0.119 mol, 50 mol %) of 2,2'-bis-(p-aminophenoxy)-biphenyl |
| II | 31.58 g (0.119 mol, 50 mol %) of 5(6)-amino-1-(4'-aminopyhenyl)-1,3,3-trimethylindane (mixture of isomers) |
| III | 80.56 g (0.250 mol) of 3,3',4,4'-benzophenonetetracarboxylic dianhydride |
| IV | 2.60 g (0.0238 mol) of 4-aminophenol |
| V | 1300 ml of N,N-dimethylacetamide |
| VI | 63.8 g (0.625 mol) of acetic anhydride and |
| VII | 12.65 g (0.125 mol) of triethylamine |

Yield 151.2 g (95% of theory).

$\eta_{intr}$: 0.383 dl/g (0.55 in N,N-dimethylacetamide at 25° C.).

The components (a)-(e) used in the following Use Examples are as follows:

Epoxy resin a1: A tetraglycidyl derivative of 4,4'-diaminodiphenylmethane having an epoxide content of 7.8 equivalents/kg and a viscosity at 50° C. of approx. 1.3 Pa.s.

Epoxy resin a2: An epoxy-phenol novolak having a functionality of 3.6 and an epoxide content of 5.6 equivalents/kg, a viscosity at 50° C. of approx. 40 Pa.s and an average functionality of 3.2 epoxide groups per molecule.

Epoxy resin a3: The tetraglycidyl ether of 2,2,6,6-tetramethylolcyclohexanol (prepared according to Example 2 of U.S. Pat. No. 4,549,008) having an epoxide equivalent weight of 129.

Epoxy resin b1: An epoxy-phenol novolak which is liquid at room temperature and has a functionality of 2.2, an epoxide content of 5.7 equivalents/kg and a viscosity at 50° C. of 1.4 Pa.s.

Polyether imide having OH end groups: A polyether imide prepared according to one of Examples 1–4 above.

Polyether sulfone having OH end groups: Ultrason ® 49K made by BASF (a polyether sulfone having phenolic end groups and a molecular weight of approx. 11,000).

Polyether sulfone 1: Victrex ® 100P made by ICI having a molecular weight of approx. 25,000, a glass transition temperature of 210° C. and recurring units of the formula

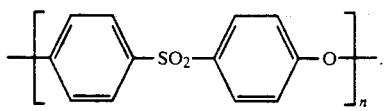

Polyimide 1: A polyimide having phenylindane units and a glass transition temperature of 305° C. and an average molecular weight of approx. 65,000 (Matrimid ® 5218, Ciba-Geigy).

Polyether imide 1: A polyether imide having recurring units of the formula

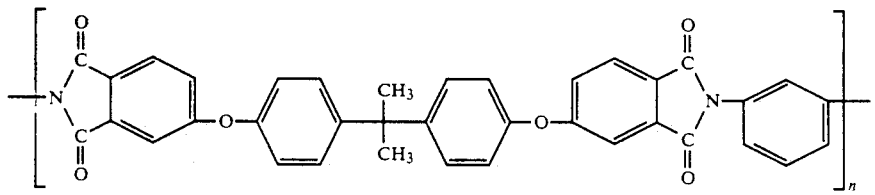

and a glass transition temperature of 219° C. (Ultem ® 1000 made by General Electric).

II. USE EXAMPLES

Example A1

165 g of the polyether imide according to Example 1, 50 g of epoxy resin a1, 50 g of epoxy resin b1 and 65 g of 4,4'-dihydroxydiphenyl ether are dissolved in 765 g of methylene chloride. A film of the solution is drawn on a silicone paper by means of a doctor blade. After drying (12 hours at 50° C. and 30 minutes at 90° C. in vacuo), a homogeneous, tough film is formed. Several layers of the film are compressed for 10 minutes at 20° C. and approx. 300 kPA and are then cured in an oven for 3 hours at 210° C. The cured moulding (30×30×1 mm) has a well-defined Tg (measured by means of thermomechanical analysis) of 193° C. (softening starts at 169° C).

Example A2

50 g of epoxy resin a1 and 50 g of epoxy resin b1 are added to a solution in methylene chloride of 82 g of the polyether-imide according to Example 1 and 82 g of a polyimide having phenylindane units and a glass transition temperature of 305° C. and an average molecular weight of approx. 65,000 (Matrimid ® 5218, Ciba-Geigy), and the mixture is stirred thoroughly. The solution is concentrated to a resin content of approx. 40% by weight. A solution of 65 g of 4,4'-dihydroxydiphenyl ether in methyl ethyl ketone is then added with stirring. After the solvent has been evaporated to a solids content of approx. 70% by weight, a film is drawn and processed according to Example A1. A Tg of 225° C. (glass transition starts at 199° C.) is measured on the resulting mouldings.

Example A3

Example A1 is repeated, but using 165 g of the polyether-sulfone having OH end groups as the thermoplastic. A Tg of 165° C. is measured after curing.

Example A4

30 g of polyether sulfone having OH end groups are dissolved in 300 g of methylene chloride. After 15 g of epoxy resin a2 and 85 g of epoxy resin b1 have been added the solvent is removed by evaporation, the mixture is heated to 140° C. and 40 g of 2,7-dihydroxynaphthalene are added. After the mixture has been cooled to 120° C. 0.1 g of 2-ethyl-4-methylimidazole is added, and the mixture is poured into an aluminium mould (4×80×80 mm). After curing for 2 hours at 140° C. and for 3 hours at 180° C., the following properties are determined:
Tg=128° C.
Flexural strength (ISO 178)=150 MPa.
Flexural elongation (ISO 178)=12.7%.
Impact strength (ISO 179)=83 kJ/m$^2$.

Example A5

60 g of polyether sulfone having OH end groups and 20 g of polyether sulfone 1 are dissolved in 200 g of methylene chloride. 15 g of epoxy resin a2 and 35 g of epoxy resin b1 are then added and are thoroughly mixed with the solution of thermoplastic. After the solvent has been removed by evaporation to give an approx. 60% by weight solution, a second solution of 40.3 g of 2,7-dihydroxynaphthalene and 0.1 g of 2-ethyl-4-methylimidazole in 40.3 g of methyl ethyl ketone is added dropwise, with stirring. Further solvent is removed by evaporation, with stirring, until a clear solution is formed. A film is drawn on a silicone paper by means of a doctor blade. A homogeneous, tough film is formed after drying (12 hours at 50° C. and 30 minutes at 90° C. in vacuo). Several layers of the film are compressed for 10 minutes at 200° C. and then cured in an oven for 2 hours at 200° C. The cured mouldng (30×30×1 mm) has a Tg of 155° C. (Softening begins at 141° C.). Part of the solution is used to impregnate a fabric composed of longitudinally arranged carbon fibres (T 300), held together with a few thermoplastic fibres as a weft ("Quasi-UD-Gewebe" G 827 made by i Brochier SA). After drying and compression, laminated sheets having the following properties are obtained:
Flexural strength transversely to the fibre (ISO 178)=119 MPa.
Edge fibre elongation ε⊥ (ISO 178)=1.57%.
Interlaminary shear strength (DIN 29971)=83 MPa.

Example A6

60 g of polyether sulfone having OH end groups are dissolved in 100 g of methylene chloride, and 15 g of epoxy resin a2 and 85 g of epoxy resin b1 are then added. After the solvent has been removed by evaporation, 0.1 g of 2-ethyl-4-methylimidazole are added and the mixture is stirred for 1 hour at 140° C. (preliminary reaction). A solution of 80 g of polyether-sulfone 1 in 150 g of methylene chloride is added and the solvent is evaporated until the solvent content is 10% by weight. 40.3 g of 2,7-dihydroxynaphthalene and a further 0.1 g of 2-ethyl-4-methylimidazole are then dissolved in methyl ethyl ketone (approx. 50% solution) and are added dropwise, with stirring. Small sheets having a Tg of 158° C. (glass transition begins at 149° C.) are obtained by the same procedure as in Example A1.

Example A7

The procedure of Example A6 is repeated, but 80 g of polyimide 1 are used instead of polyether sulfone 1. A Tg of 160° C. is found.

Example A8

Example A2 is repeated, but 82 g of polyether-sulfone having OH end groups are used instead of polyetherimide. A Tg of 154° C. is found (softening begins at 144° C.).

Example A9

60 g of polyether sulfone having OH end groups and 80 g of polyether-sulfone 1 are dissolved in 250 g of methylene chloride, and 40 g of epoxy resin a3 and 60 g of epoxy resin b1 are then added and the whole is thoroughly mixed. After the solvent has been evaporated down to approx. 10%, a 50% by weight solution of 46.3 g of 2,7-dihydroxynaphthalene and 0.1 g of 2-ethyl-4-methylimidazole in methyl ethyl ketone is added dropwise, with stirring. This mixture is used to produce a film on silicone paper, and this film is dried for 12 hours at 50° C. and then for 30 minutes at 90° C. in vacuo. The film is cut and compressed in a laboratory moulding press for 2 minutes at 200° C. to give a small sheet of pure resin. After the shaped article has been cured in an oven at 200° C. for 2 hours, its Tg is found to be 184° C. (softening begins at 161° C.).

Example A10

Example A2 is repeated, but 82 g of polyether imide 1 are used instead of polyimide 1. A Tg of 207° C. (softening begins at 179° C.) is found.

Example A11

25 g of polyether imide according to Example 3 are dissolved in 200 g of $CH_2Cl_2$ and 40 g of epoxy resin a3 and 60 g of epoxy resin b1 are added. The solvent is evaporated off by heating and the remaining mixture is then processed as in Example A4, after 58 g of 4,4'-dihydroxydiphenyl ether and 0.1 g of 2-phenylimidazole have been added. The shaped articles obtained have the following properties:

Tg = 115° C.

Flexural strength (ISO 178) = 122 MPa.

Flexural elongation (ISO 178) = >13.5% (without fracture).

Example A12

A laminate is prepared as in Example A5 using 82 g of polyether imide according to Example 2, 82 g of polyimide 1, 50 g of epoxy resin a1, 50 g of epoxy resin b1 and 65 g of 4,4'-dihydroxydiphenyl ether. The laminate has the following properties:

Tg = 225° C.

Flexural strength in the principal direction of the fibres = 1204 MPa.

Flexural strength transversely to the principal direction of the fibres = 76 MPa.

Example A13

Using 82 g of polyether imide 1 instead of polyimide 1 and with the composition and processing otherwise the same as in Example A12 gives a laminate having the following properties:

Tg = 207° C.

Flexural strength in the principal direction of the fibres = 1395 MPa.

Flexural strength transversely to the principal direction of the fibres = 65 MPa.

What is claimed is:

1. A heat-curable composition of matter which is stable on storage and which comprises
   (a) 5-70 parts by weight of an epoxy resin having a functionality of at least 3,
   (b) 95-30 parts by weight of an epoxy resin having a functionality of 2-2.5,
   (c) a diphenol (c), the amount of the diphenol being so chosen that 0.6-1.2 hydroxyl equivalents of the diphenol (c) are employed per epoxide equivalent of the epoxy resins (a) and (b), which diphenol is a compound of formula I, Ia or II

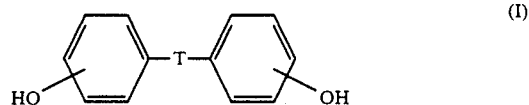

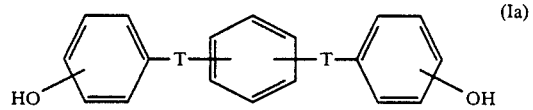

in which T is a direct bond, methylene, isopropylidene, O, S, CO or $SO_2$, and R is hydrogen or $C_1$-$C_4$-alkyl, or said diphenol is a dihydroxynaphthalene; or a mixture of these compounds, and (d) 10-150 parts by weight, relative to 100 parts by weight of the components (a) to (c) of a thermoplastic having phenolic end groups and having a glass transition temperature of at least 150° C. which is compatible with the composition of the components (a) to (c) and which is a polyimide, a polyether imide, a polysulfone, a polyether sulfone, a polyether or a polyether ketone.

2. A composition according to claim 1 which contains 15 to 50 parts by weight of epoxy resin (a), 85 to 50 parts by weight of epoxy resin (b), such an amount of diphenol (c) that 0.7-1.1 hydroxyl equivalents of diphenol are employed per epoxide equivalent of resins (a) and (b), and 20-130 parts by weight of the thermoplastic (d) relative to 100 parts by weight of components (a) to (c).

3. A composition according to claim 2 which additionally contains 0.1-1% by weight of an accelerator (c1) relative to the amount of (a) and (b).

4. A composition according to claim 2 which also contains (e) a thermoplastic which has no phenolic end groups and has a glass transition temperature of at least 180° C., the total amount of the thermoplastic components (d) and (e) being 20-130 parts by weight, relative to 100 parts by weight of components (a) to (c).

5. A composition according to claim 1, wherein the epoxy resins (a) and (b) have an epoxide content of 5–11 equivalents/kg, and are glycidyl ethers, glycidyl esters or N-glycidyl derivatives of a cycloaliphatic, aromatic or heterocyclic compound.

6. A composition according to claim 1, wherein the epoxy resins (a) and (b) are epoxy-novolaks or glycidyl derivatives of a bisphenol, an aromatic diamine, an aminophenol, a hydantoin or a tetramethylolcyclohexane.

7. A composition according to claim 1, wherein the epoxy resin (a) has a functionality of 3 to 4 and is an epoxyphenol novolak or a gylcidyl derivative of an aromatic diamine, an aminophenol or a tetramethylolcyclohexane.

8. A composition according to claim 1, wherein the epoxy resin (b) has a functionality of 2 to 2.2 and is an epoxyphenol novolak or a glycidyl derivative of bisphenol A or of bisphenol F.

9. A composition according to claim 1, wherein the diphenol (c) is bisphenol A, bisphenol F, bisphenol P, bisphenol M, 4,4'-dihydroxydiphenyl sulfide, 2,6-dihydroxynaphthalene, 4,4'-dihydroxydiphenyl ether or 2,7-dihydroxynaphthalene.

10. A composition according to claim 1, which, in addition to the components (a) to (d) also contains (c1) 0.05–5% by weight of an accelerator, relative to the epoxy resins (a) and (b).

11. A composition according to claim 1, which, in addition to the components (a) to (d), also contains (e) a thermoplastic which has no phenolic end groups and has a glass transition temperature of at least 180° C., the total amount of the total amount of the thermoplastic components (d) and (e) being 10–150 parts by weight, relative to 100 parts by weight of the components (a) to (c).

12. A composition according to claim 1, wherein the thermoplastic having phenolic end groups (d) is a polyether sulfone, a polyimide or a polyether imide.

13. A composition according to claim 12, wherein the polyimide or the polyether imide contains, as the diamine, a phenylindanediamine and/or a 2,2'-bis-(aminophenoxy)-biphenyl.

14. A shaped article prepared by curing the composition according to claim 1.

15. A prepreg or adhesive film prepared using the composition according to claim 1.

* * * * *